Aug. 4, 1959 W. C. BUHLER 2,898,061
TOROIDAL AIRFOIL PARACHUTE
Filed June 27, 1957
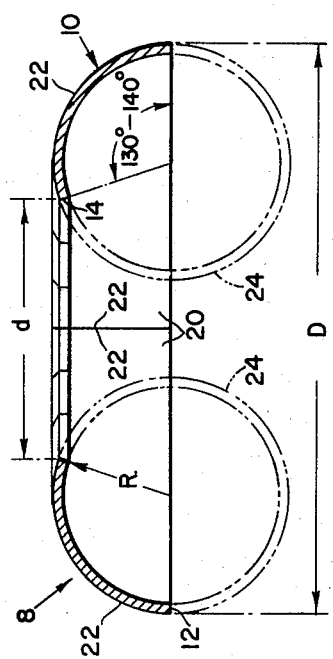
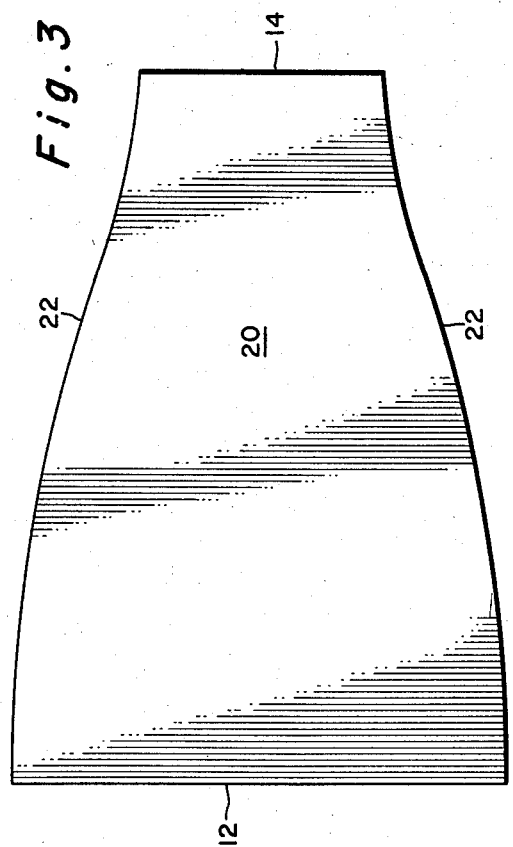
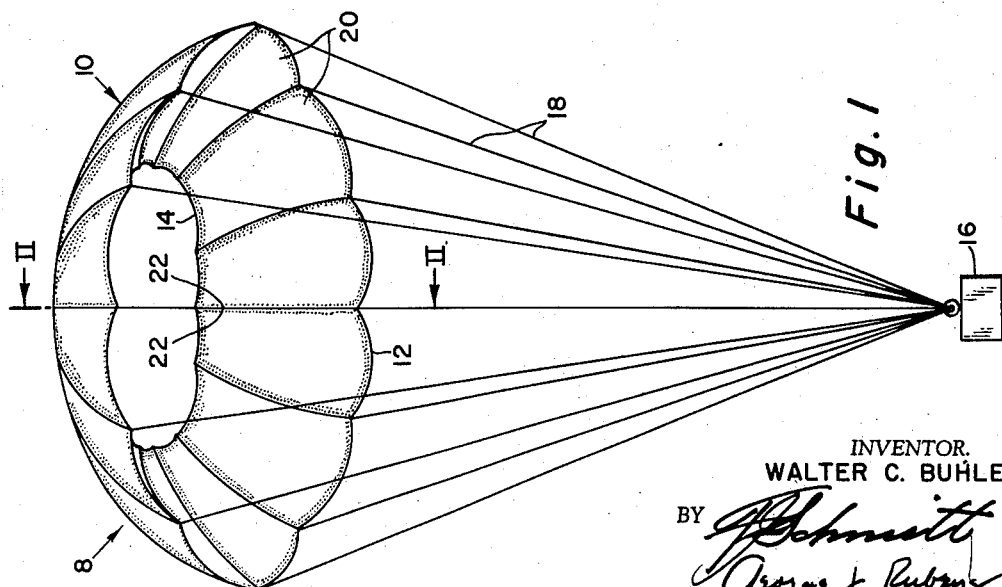
INVENTOR.
WALTER C. BUHLER

United States Patent Office 2,898,061
Patented Aug. 4, 1959

2,898,061

TOROIDAL AIRFOIL PARACHUTE

Walter C. Buhler, Reseda, Calif., assignor to the United States of America as represented by the Secretary of the Navy Application June 27, 1957, Serial No. 668,585

4 Claims. (Cl. 244—145)

(Granted under Title 35, U.S. Code (1952), sec. 266)

The invention described herein may be manufactured and used by or for the Government of the United States of America for governmental purposes without the payment of any royalties thereon or therefor.

This invention relates to airfoil parachutes adapted for operation in conjunction with high speed aircraft, and more particularly, to an improved airfoil parachute construction which eliminates the need for auxiliary suspension lines.

This invention resides in an improvement over my earlier Patent No. 2,523,276, issued September 26, 1950. In this prior patent the importance was recognized of providing a specified sized vent opening in the canopy apex in relation to the diameter of the canopy for producing large deceleration forces at a critical opening velocity during descent. This construction permitted a considerable reduction in weight of the parachute for a given load capacity as compared to prior art parachutes and also increased parachute stability. The canopy of the prior patent was formed in cross section as a zone of a sphere which configuration was distorted by the use of auxiliary suspension lines extending from the periphery of the canopy at the vent opening to the main suspension lines. This arrangement restricted the mouth of the vent opening downwardly in order to inflate the parachute. The auxiliary suspension lines were resilient to enable the curvature of the skirt to be increased when under load beyond the distorted spherical configuration.

It has been found that the prior construction had limited use because of complications arising from the presence of the auxiliary suspension or vent lines. Furthermore, the auxiliary suspension lines increased the bulk and weight of the parachute, which are important considerations for parachutes employed in high speed applications for recovery of missiles and drones.

A parachute constructed in accordance with the present invention eliminates the need for auxiliary suspension lines, and their inherent disadvantages, while simultaneously simplifying the structure. This novel result is accomplished by designing the canopy as an undistorted zone of a torus, as distinguished from the zone of a sphere that is distorted as is utilized in the earlier patent. A gore from a parachute constructed of a zone of a torus as taught by the present invention, has a configuration in a developed or plan view in which the opposite lateral sides are undulated curves. That is, a portion of the curved side of each gore at the vent opening of the canopy being concave, and the adjacent portion of each curved side at the hem end of the canopy being convex, each curve thus having an S-shaped edge.

A principal object of this invention is to provide an airfoil parachute having a vent opening at the apex thereof which does not require the use of auxiliary suspension lines.

Other objects are to provide such an airfoil parachute which is simple, not bulky, and light weight.

Other objects and many of the attendant advantages of this invention will be readily appreciated as the same becomes better understood by reference to the following detailed description when considered in connection with the accompanying drawings wherein:

Fig. 1 is a perspective diagrammatic view of an inflated airfoil parachute constructed in accordance with this invention;

Fig. 2 is a partial diagrammatic cross sectional view of the parachute canopy taken along line II—II of Fig. 1; and Fig. 3 is a developed or plan view of one of the gore sections from which the canopy is fabricated.

Referring to the drawing where like reference numerals refer to corresponding parts, reference numeral 8 is a parachute comprising a canopy 10 having a skirt portion 12 and a vent opening 14 located at the apex thereof. A load 16 is connected to the canopy skirt portion by load suspension lines 18 in any suitable manner conventional in the art.

The advantage of an airfoil parachute is described in my Patent 2,523,276, the instant invention residing in an improvement in the construction of the canopy and gores 20 from which it is fabricated. As best illustrated in Fig. 2, canopy 10 is designed to be a zone or a portion of a torus, the zone, or peripheral length of the gore, being indicated in solid lines, the remaining unused zone of the torus being indicated by broken lines 24.

It has been found for best results that the peripheral length of the gores should extend between the hem of the canopy skirt 12 and vent opening 14 for an arc of 130 to 140 degrees of the torus. Radius R of the torus will vary with the diameter $d$ of vent opening 14 and diameter D of the canopy skirt as presently described. In accordance with the teaching of my aforementioned patent, a preferred drag coefficient of parachute 8 is obtained with a vent diameter $d$ of the canopy within the limits of from approximately forty to sixty-five percent of the nominal diameter D of the skirt.

The development shape of each gore 20, that assembled will produce a zone of a torus (Fig. 2), is shown in Fig. 3. The lateral edges 22 of the sides of the gores are longitudinally symmetrical and have a configuration of an undulating curves diverging from the narrow vent opening end 14 to the wider skirt hem end 12, that portion of the curve adjacent the vent opening end being concave and the portion of the curve adjacent the skirt hem end being convex, thus forming an S-shaped curve.

When fabricated into the assembled canopy having a zone of a torus, the joined edges 22 of adjacent gores now lie in a transverse plane radially intersecting the torus, as shown in Figs. 1 and 2.

An airfoil parachute constructed according to the present invention will inflate under load without the need for auxiliary load suspension lines heretofore found necessary. Eliminating the need for the auxiliary load suspension lines simplifies the parachute reducing weight and cost.

Obviously many modifications and variations of the present invention are possible in the light of the above teachings. It is therefore to be understood that within the scope of the appended claims the invention may be practiced otherwise than as specifically described.

I claim:

1. A parachute comprising a canopy having depending shroud lines, said canopy constructed to form the zone of a torus and having a skirt portion having inner and outer peripheral edges, said inner edge defining a substantially circular vent opening in the apex thereof, the diameter of said vent opening being within the limits of from forty to sixty-five percent of the normal diameter of the skirt, said canopy being connected to the shroud lines only at the outer edge of the skirt.

2. The parachute of claim 1 wherein the zone of the torus is undistorted and extends from the hem of the skirt portion to the vent opening for an arc within the limits of from one hundred thirty to one hundred forty degrees.

3. The parachute of claim 1 wherein said canopy comprises a plurality of gores, opposite lateral sides of each gore in a developed plan view being undulating diverging curves extending from the vent opening to the skirt portion.

4. A parachute comprising a canopy having depending shroud lines, said canopy constructed to form an undistorted zone of a torus and having a skirt portion having inner and outer peripheral edges, said inner edge defining a substantially circular vent opening in the apex thereof, the diameter of said vent opening being within the limits of from forty to sixty-five percent of the normal diameter of the skirt, said zone of the torus extending for an arc within the limits from one hundred thirty to one hundred forty degrees, said canopy being connected to the shroud lines only at the outer edge of the skirt.

References Cited in the file of this patent

UNITED STATES PATENTS

| | | |
|---|---|---|
| 2,523,276 | Buyler | Sept. 26, 1950 |
| 2,823,881 | Patterson | Feb. 18, 1958 |

FOREIGN PATENTS

| | | |
|---|---|---|
| 594,744 | Great Britain | Nov. 18, 1947 |
| 874,033 | France | Apr. 13, 1942 |